(12) United States Patent
Budavari et al.

(10) Patent No.: US 11,144,123 B2
(45) Date of Patent: Oct. 12, 2021

(54) SYSTEMS AND METHODS FOR HUMAN-MACHINE SUBCONSCIOUS DATA EXPLORATION

(71) Applicant: THE JOHNS HOPKINS UNIVERSITY, Baltimore, MD (US)

(72) Inventors: Tamas Budavari, Baltimore, MD (US); Sandor Szalay, Baltimore, MD (US); R. Jacob Vogelstein, Baltimore, MD (US); Nicholas Samuel Carey, Baltimore, MD (US)

(73) Assignee: THE JOHNS HOPKINS UNIVERSITY, Baltimore, MD (US)

(*) Notice: Subject to any disclaimer, the term of this patent is extended or adjusted under 35 U.S.C. 154(b) by 198 days.

(21) Appl. No.: 15/348,439

(22) Filed: Nov. 10, 2016

(65) Prior Publication Data
US 2017/0131768 A1   May 11, 2017

Related U.S. Application Data

(60) Provisional application No. 62/253,459, filed on Nov. 10, 2015.

(51) Int. Cl.
*G06F 3/01* (2006.01)
*G06N 20/00* (2019.01)

(52) U.S. Cl.
CPC .............. *G06F 3/015* (2013.01); *G06F 3/012* (2013.01); *G06F 3/013* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2013/0246319 | A1* | 9/2013 | Tamayo | G06Q 10/109 706/12 |
| 2014/0098136 | A1* | 4/2014 | Fein | G06T 19/006 345/633 |
| 2014/0347265 | A1* | 11/2014 | Aimone | G09G 3/003 345/156 |
| 2016/0019434 | A1* | 1/2016 | Caldwell | G06K 9/4671 345/474 |

* cited by examiner

*Primary Examiner* — Andre L Matthews
(74) *Attorney, Agent, or Firm* — MH2 Technology Law Group, LLP

(57) ABSTRACT

Systems, computer readable media, and method concern includes generating data renderings for a data set. The data renderings for the data set include one or more of visual renderings of portions of the data set and one or more sonic renderings of portions of the data set. The method further includes providing the data renderings to a user via one or more output devices. The method also includes capturing biofeedback data from the user using one or more human interface devices. The biofeedback data includes biological responses to the one or more data renderings. Further, the method includes continuously generating and providing new data renderings based on the biofeedback data. The new data renderings incorporate features in the data renderings identified from the biofeedback data. The method also includes determining one or more features of interest in the data set based on the biofeedback data and the new data renderings.

20 Claims, 7 Drawing Sheets

SYSTEMS AND METHODS FOR HUMAN-MACHINE SUBCONSCIOUS DATA EXPLORATION

CLAIM OF PRIORITY

This application claims priority to U.S. Provisional Patent Application 62/253,459 filed on Nov. 10, 2015, which is hereby incorporated by reference in its entirety

BACKGROUND

As computers have evolved, they have become ever more powerful while shrinking in size. Meanwhile, a global communication/data system known as the Internet has been constructed that allows users anywhere in the world to connect and share data. Today, globally-connected semiautonomous data machines can be found in everything from mobile phones to thermostats. This explosion of constantly connected, powerful, ubiquitous, miniature computers has allowed for the creation of enormous data generating and mining networks. Companies can now collect data on almost every aspect of their operations from delivery routes to power usage or clients' webclicks. These companies can use these "Big Data" sets to optimize operations and increase value. In fact, there has arisen an entire discipline devoted to this called Business Intelligence.

Even though individuals and companies have access to huge amounts of data, all of this data may not be useful for all analysis. The sheer size and power of the infrastructure necessary to manage and analyze Big Data sets requires unique solutions. In addition, the size of the Big Data sets requires creative problem solving in order to begin to be able to analyze the data. Currently, Business Intelligence solutions revolve around trying to make the data more manageable for analysis. In particular, analysts are developing algorithms that only use the "important parts" of the Big Data sets or are designing models that can use multiple computers for analysis.

As exponentially more samples from the physical and cyber worlds are collected and fed into a data stream, the chances of keeping up with the data rate are slimming rapidly. Today, data analysts almost exclusively rely on machine learning techniques. These applications transform the raw data into lower dimensional feature spaces that capture different aspects of the input stream. While often existing methods cannot scale to the current large volumes of data, recent theoretical advancements of randomized algorithms may enable approximate variants to be directly applicable to large-scale data. This, however, may not be enough: the incremental improvement in machine learning is only a small step toward the goal of rapid knowledge extraction.

The number of methods available for knowledge extraction has reached a point where making the correct choice of method by itself may become a major issue. Some methods perform better on certain types of complex problems, while others are more robust to omnipresent artifacts. The purpose of these different algorithms is to aid the learning experience and to speed up discoveries, but the aggregate output of all these methodologies is again too much for any analyst to fully comprehend. Computers can perform any one of an infinite number of possible projections or non-linear embeddings, but unsupervised programs do not know where to look in the data. Moreover, the computers cannot differentiate obvious patterns from emerging discoveries. Furthermore, analysts must constantly assess the validity, correctness, and relevance of analytical results, while they attempt to fully understand the situation reflected in the data. As such, the efficiency of Big Data processing algorithms, and the systems implementing them, need to be improved by improving the quality of analytical feedback from an analyst, and providing the improved feedback to the algorithms faster.

SUMMARY

Aspects of the present disclosure concern a method that includes generating data renderings for a data set. The data renderings for the data set include one or more of visual renderings of portions of the data set and one or more sonic renderings of portions of the data set. The method further includes providing the data renderings to a user via one or more output devices. The method also includes capturing biofeedback data from the user using one or more human interface devices. The biofeedback data includes biological responses to the one or more data renderings. Further, the method includes continuously generating and providing new data renderings based on the biofeedback data. The new data renderings incorporate features in the data renderings identified from the biofeedback data. The method also includes determining one or more features of interest in the data set based on the biofeedback data and the new data renderings.

Additional aspects of the present disclosure concern a system that includes one or more output devices, one or more human interface devices, and a computer system. The computer system includes one or more memory devices storing instructions, and one or more processors coupled to the one or more memory devices and configured to execute the instructions to perform a method. The method includes generating data renderings for a data set. The data renderings for the data set include one or more of visual renderings of portions of the data set and one or more sonic renderings of portions of the data set. The method further includes providing the data renderings to a user via one or more output devices. The method also includes capturing biofeedback data from the user using one or more human interface devices. The biofeedback data includes biological responses to the one or more data renderings. Further, the method includes continuously generating and providing new data renderings based on the biofeedback data. The new data renderings incorporate features in the data renderings identified from the biofeedback data. The method also includes determining one or more features of interest in the data set based on the biofeedback data and the new data renderings.

Additional aspects of the present disclosure concern a non-transitory computer readable medium storing instructions for causing one or more processors to perform a method. The method includes generating data renderings for a data set. The data renderings for the data set include one or more of visual renderings of portions of the data set and one or more sonic renderings of portions of the data set. The method further includes providing the data renderings to a user via one or more output devices. The method also includes capturing biofeedback data from the user using one or more human interface devices. The biofeedback data includes biological responses to the one or more data renderings. Further, the method includes continuously generating and providing new data renderings based on the biofeedback data. The new data renderings incorporate features in the data renderings identified from the biofeedback data. The method also includes determining one or more features of interest in the data set based on the biofeedback data and the new data renderings.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Logical and structural changes can be made to the examples of the various implementations without departing from the spirit and scope of the present teachings. The following detailed description is, therefore, not to be taken in a limiting sense and the scope of the present teachings is defined by the appended claims and their equivalents.

Aspects of the present disclosure are directed to a human-machine co-learning system that allows the cooperative analysis of data by a user and a computer system. Human intuition may not work in higher than three dimensions, and the human-machine co-learning system can extract knowledge from the available data. The human-machine co-learning system closes the loop between computer systems and users by collecting feedback representing the user's reactions to the data renderings. The human-machine co-learning system alters how users (e.g., data analysts) interact with data by leveraging the most evolved aspects of human intuition and pairing them with the thoroughness of modern computing/machine learning. In aspects, the human-machine co-learning system provides a constant multi-channel synchronous feedback loop that connects the computer system to the user. The human-machine co-learning system creates varying data renderings (e.g., visualizations, sonifications, physical stimulus, etc.), and presents the data renderings to a user. As the data renderings are presented to the user, the human-machine co-learning system simultaneously collects the user's reactions (biofeedback) to the data renderings (e.g., brain waves, eye-movements, micro facial expressions, etc.). In real-time, the human-machine co-learning system incorporates biofeedback into one or more statistical models behind the data rendering. This human-machine co-learning system enables an effective exploration in the parameter space and an effortless navigation in the data.

Figure 1:
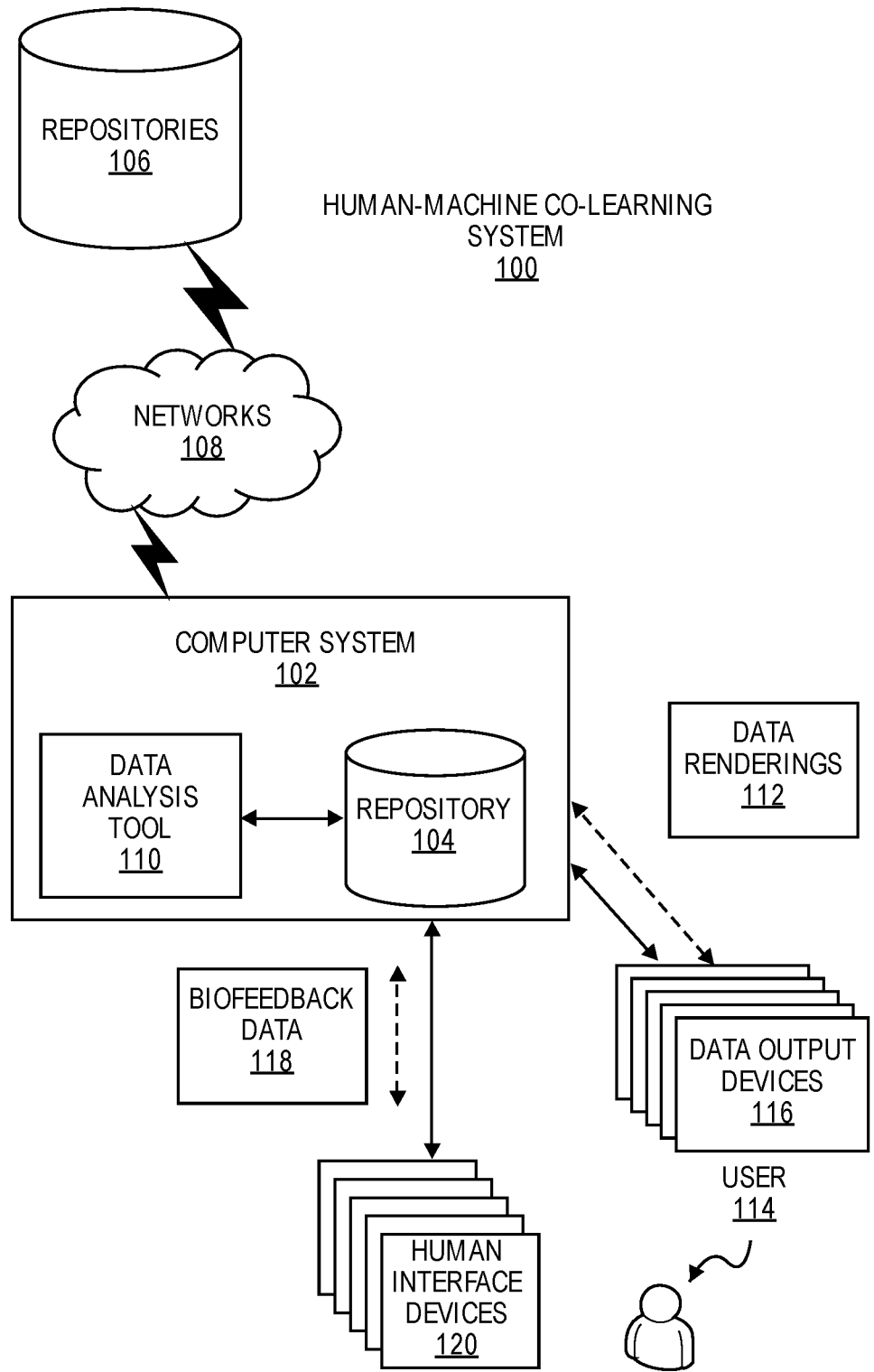
FIG. 1 illustrates an example of a human-machine co-learning system, according to various aspects of the present disclosure.

FIG. 1 illustrates a human-machine co-learning system 100 in which data can be analyzed, according to aspects of the present disclosure. While FIG. 1 illustrates various components contained in the human-machine co-learning system 100, FIG. 1 illustrates one example of a human-machine co-learning system and additional components can be added and existing components can be removed.

As illustrated in FIG. 1, the human-machine co-learning system 100 includes a computer system 102. The human-machine co-learning system 100 can represent the computer systems and network hardware of public or private entities, such as governmental agencies, individuals, businesses, partnerships, companies, corporations, etc., utilized to support the entities. The computer system 102 can be any type of conventional computer systems that is operating in the human-machine co-learning system 100 or supporting the human-machine co-learning system 100. For example, the computer system 102 can include various types of servers, such as file servers, web servers, application servers, database servers, email servers and the like, that provide services within the human-machine co-learning system 100. Likewise, for example, the computer system 102 can include laptop computers, desktop computers, tablet computers, mobile phones, and the like used by the personnel of the entities.

Additionally, for example, the human-machine co-learning system 100 includes other hardware and computer systems that support the human-machine co-learning system 100. For example, the human-machine co-learning system 100 can include gateways, routers, wireless access points, firewalls, and the like that support any type of communications networks to allow the computing systems in the human-machine co-learning system 100 to communicate. In any of the examples, the computer systems, including the computer system 102, in the human-machine co-learning system 100 include hardware resources, such as processors, memory, network hardware, storage devices, and the like, and software resources, such as operating systems (OS), application programs, and the like.

The computer system 102 can be coupled to a repository 104. The repository 104 can be configured to store data that is associated with and utilized by the human-machine co-learning system 100. The repository 104 can be implemented using any type of type of storage media. The repository 104 can store the data in any type of format that is utilized by the human-machine co-learning system 100.

The computer system 102 can also be coupled to one or more repositories 106 via one or more networks 108. The computer system 102 can be configured to retrieve or receive, via a network 108, the data used by the human-machine co-learning system 100 from the repositories 106. The network 108 can be any type of network whether public or private. The repository 106 can be any type of computer system that stores information about the components.

According to aspects of the present disclosure, the computer system 102 is configured to execute a data analysis tool 110. The data analysis tool 110 is configured to create varying data renderings 112 (e.g., visualizations, sonifications, physical stimulus, etc.), and present the data renderings to a user 114. The data analysis tool 110 is configured to provide the data renderings to the user 114 using one or more data output devices 116 coupled to the computer system 102. The data analysis tool 110 is configured to perform data rendering and analysis techniques with biofeedback data 118 collected from the user 114 using one or more human interface devices 120. The data analysis tool 110 is configured to provide a framework for cooperative learning where statistical learning algorithms provide the user 114 with tailored data renderings 112 based on the current interest of the user 114 using a combination of logic and subconscious intuition determined from the biofeedback data 118. By using the biofeedback data 118 from the human interface devices 120, the human-machine co-learning system 100 provides improved data analysis by speeding up the interaction between the user 114 and the computer system 102 and enabling advanced data exploration in higher dimensions than possible with standard data review.

In aspects, the data analysis tool 110 is configured as a software program that is capable of being stored on and executed by the computer system 102. The data analysis tool 110 can be written in a variety of programming languages, such as JAVA, C++, Python code, Visual Basic, hypertext markup language (HTML), extensible markup language (XML), and the like to accommodate a variety of operating systems, computing system architectures, etc.

The data analysis tool 110 is configured to operate, at least partially, under the control of a user 114. The data analysis tool 110 can be initiated and configured by the user 114. For example, the user 114 can select data to be analyzed by the data analysis tool 110, can select types of data analysis to be performed by the data analysis tool 110, can select and configure the data output devices 116 and human interface devices 120, and the like. The data analysis tool 110 can output results of the data analysis to the user 114 or any other system or user in the human-machine co-learning system 100. To communicate with the user 114, the data analysis tool 110 is configured to generate and provide one or more user interfaces. The user interfaces can be any type of command line and/or graphical user interface (GUI) that allows the user 114 to interact with the data analysis tool 110. The data analysis tool 110 is configured to provide, via the user interfaces, controls, forms, reports, etc., to allow the user 114 to interact with the data analysis tool 110 and perform the processes described herein.

In aspects, the human-machine co-learning system 100, controlled by one or more users 114, can process one or more data sets. For example, the data analysis tool 110 can evaluate data in the data set to identify parameters and potential embeddings, and produces one or more data renderings 112, (e.g., visual representations, audio representations, physical stimulus etc.) of the data. The data analysis tool 110 can provide the data renderings to the data output devices 116 that are consumed by the user 114.

In aspects, the data output devices 116 can include any type of output device to provide the data renderings 112 to the user 114. For example, the data output devices 116 can include one or more computer displays or monitors for displaying the visual renderings of the data renderings 112. The one or more computer displays or monitors can be any type or configuration, for example, liquid crystal displays (LCDs), plasma displays, cathode ray tube (CRT) displays, and the like.

Likewise, for example, the data output devices 116 can include one or more audio output devices. The audio output devices can output sonic renderings of the data renderings of the data set. The audio output devices can include any type and configuration of audio device.

For example, sonfication and music-based feature selection can be examples of data rendering that can create a more immersive and efficient environment. In its simplest form, the human-machine co-learning system 100 can use sound (e.g., music, sound effects, etc.) to drive aspects of the data rendering. For example, the data analysis tool 110 can map different harmonics in the music to different features in the data set. With the rhythmic periodic changes of the music, the brain of the user 114 can anticipate the new information, which makes rapid changes in the renderings easier to interpret. Exploiting the brain's unique timing ability, the data analysis tool 110 can pinpoint interesting new features in time that can be flagged and later revisited (e.g., mapped to more prominent modes of the data rendering). For example, the data analysis tool 110 can map different features of the data to different Fourier harmonics. The rendered features change rapidly with the music, yet, they can be perceived well when they are expected due to the user 114 brain's unique timing ability. In connection with brain wave measurements, discussed further below, the data analysis tool 110 can accurately identify the relevant features in time even if they are shown just briefly but periodically. These features can be mapped to more frequent harmonics or more prominent channels of data rendering for further analysis.

Likewise, for example, the data analysis tool 110 can actively shape the sound to channel additional features to the user 114. Active shaping of sound can enable the data analysis tool 110 to continuously deliver additional features to the user 114. For example, in utilizing sonification, the data analysis tool 110 can utilize a concept is familiarity with the soundscapes. For example, stadiums, concert halls or living rooms reverberate the sounds differently, and these subtle changes are accurately picked up by the human ear. By applying these effects to any audio recording, the data analysis tool 110 can represent lower frequency, contextual information. Likewise, the data analysis tool 110 can map higher frequency signals to other familiar sound effects, such as the noises inside a moving car, driving on asphalt or gravel and the raindrops on the windshield. For example, most can easily relate to a situation where a person is driving a car and suddenly hears a siren. The audio cue tells the person that something is occurring in our environment, the human experience identifies the siren as an emergency vehicle and provides information about appropriate driver responses to emergency vehicles. If this sonification and visualization was applied to data rendering presented to the user 114, the user 114 can begin visually scanning the environment (e.g., the visualization of the data renderings 112) using audio clues to localize the emergency vehicle and determine its probable pathway to decide what actions to take as the driver of a vehicle. In the example, the user 114 seamlessly performs the analysis to provide an integrated, real-time assessment of the current environment which can be captured by the data analysis tool 110. The data analysis tool 110 can apply this concept to the perception and understanding of big data to utilize the human ability to seamlessly integrate input from multiple senses to rapidly make assessment about what is occurring in the surrounding environment. As such, the human-machine co-learning system 100 can create a more immersive and more efficient environment to study vast amounts of data.

Likewise, for example, the data output devices 116 can include other devices to output other physical stimuli to the user 114. For example, the data output devices 116 can include haptic devices (e.g., vibration), environment control devices (e.g., heating, cooling etc.) and the like.

As the user 114 consumes the data renderings, the human interface devices 120 detects and records, as biofeedback data 118, the user 114 various reactions to the data renderings 112, and the data analysis tool 110 can incorporate the biofeedback data 118 into the data evaluation process. For example, immediate biofeedback data 118 from the user 114 can drive the real time creation of the data renderings 112 by steering through the parameter space of possible embeddings. Monitoring the user 114 behavior and response can provide useful information about ongoing thought processes of the user during the data analysis.

In aspects, the human interface devices 120 can capture signals representing conscious and subconscious reactions of the user 114 to the data renderings 112. The human interface devices 120 can be any type of device that is capable of sensing or detecting actions, reactions, inputs, and the like of the user 114. For example, the human interface devices 120 can be configured to capture the biofeedback data 118 including brain wave data (e.g., electroencephalogram (EEG) data), eye movement tracking data, micro-facial expressions data, body language, vital sign data (heart rate, blood pressure, respiration rate, etc.), muscle movement data, capillary dilation data, skin conductivity data, and the like.

For example, the human interface devices 120 can include one or more brain-computer interfaces (BCis) that monitor brain waves of the operator. In some aspects, the BCis can be non-invasive to the operator, for example, using conductive electrodes placed on the scalp of the user 114 to detect microvoltscale electrical potentials created by many simultaneously active neurons in the cortex. Consumer-grade EEG devices, for example, can deliver high-resolution temporal information that can be adequate to detect event-related evoked potentials.

Likewise, for example, the human interface devices 120 can include BCis that collect electro-oculogram (EOG) data, electromyogram (EMG), and combination thereof, in addition to action potentials of the peripheral portions of the cranial nerves outside the skull, produced by such reflexes. The action potentials can be detected through skin recordings of bio-potentials. One example of a BCI that can detect EEG, EOG, and EMG is a neural impulse actuator. In this example, the neural impulse actuator can have the following specifications: head band with integrated left and right sensors, silver chloride (AgCI) medical-grade electrodes, and center reference sensor with common mode rejection using inversion of left and right signals; single channel recording; resolution capable of identifying 0.1 microvolt potentials; 4 kHz sampling rate; universal serial bus (USB) 2.0 interface with signal transmission speed of at least 217 packets/sec; and host processing device having a multi-core processor with processing speed of at least 1.5 GHz. In another example, the single channel recording can be replaced with dual-channel recording, also adding electrode-amplifier modules that improve signal-to-noise ratio, a wireless interface between headband and host processing device, and hardware-based (e.g., synthesized application-specific integrated circuit) signal processing to resolve left-to-right brain hemisphere asymmetries.

Likewise, for example, the human interface devices 120 can include eye movement tracking devices. The eye movement tracking devices can utilize one or more light sources, one or more cameras, and the like to capture and track the movement of the user 114 eyes, even as the positioning of the user 114 head constantly changes. For example, the eye movement tracking devices can image the user 114 eyes in a wide spectrum of wavelengths, from the visible to infrared, to monitor the position of the pupils (bright in the infrared range) in addition to the reflections of light sources (bright in the visible range). In one example, the eye movement tracking devices can use high-definition cameras, to resolve the axis of each eye independently, and to use the angular disparity to determine the z-axis position, thereby localizing the point of interest even in the third dimension.

Likewise, for example, the human interface devices 120 can include computer input devices such as mice, keyboards, microphones, and the like. For example, rapidly changing low-dimensional embeddings in the data renderings 112 represent a path of a randomized walk in the parameter space that is primarily driven by the inputs of the user 114. The human interface devices 120 can include simple interface inputs to enhance the currently displayed scene or move out to examine the broad context. These advanced "grand tours" can offer more variations and angles of view than just linear global projections of the data, and the data analysis tool 110 can create and display them without explicit requests. For example, with a mouse-click, the user 114 can pin down apparent phenomena around a point/event to explore, and the appropriate embedding strategies can be immediately selected. Another simple control can affect the speed of the motion along the path, the rate of the information flow. In addition to traditional data exploration tools, the emphasis here is on a simple interface that drives an advanced analysis engine behind the data renderings 112. Such a design can be extended to make use of other types of inputs that are less taxing on the user 114 and faster in response. The interface can also work independently of the dimensionality of the data, which is often too large to be manually explored anyway.

The human-machine co-learning system 100 can correlate the biofeedback data 118 with the data renderings 112. For example, based on the received biofeedback data 118, the data analysis tool 110 can identify and enhance local signatures and their immediate surroundings. Using the local signature and surrounding, the data analysis tool 110 can uncover hidden topological relations among the data set forming the data renderings 112, while more global views can provide better contextual information. As the user 114 considers competing hypotheses, the human-machine co-learning system 100 can automatically present the data renderings in a timely manner. The data analysis tool 110 can automatically render feature vectors into a familiar environment, where the user 114 can subconsciously make the objective choices without effort and without blurring the results with false rationales that may be based on selective or insufficient facts.

To enable a user 114 to visually navigate a data set in substantially real-time, the human-machine co-learning system 100 implements a combination of techniques pertaining to machine learning, data rendering streaming, and biofeedback acquisition. For example, the data analysis tool 110 can implement a special class of randomized algorithms that work directly on the data renderings 112 and the biofeedback data 118 using incremental strategies. As new data for the data renderings 112 and/or the biofeedback data 118 arrives, the data analysis tool 110 updates internal models (with or without storing the data) and goes on to fetch the next data in line. For example, the data analysis tool 110 can utilize algorithms including clustering or regression analyses, low-dimensional embeddings (e.g., Principal Component Analysis (PCA)). In one example, the data analysis tool 110 can utilize incremental and robust PCA generalization. These summary statistics provide different insights into the raw data.

In another example, the data analysis tool 110 can utilize algorithms and process called Rapid Serial Visual Presentation (RSVP). In RSVP, the user 114 is presented with data renderings 112 including a series of images in rapid succession while the biofeedback data 118 including neural activity is monitored. If the user 114 looks for a particular type of visual content in the image stream, the neural activity following the matching content will differ from the baseline behavior. This difference can be traced back with high precision to the triggering image in the data renderings 112. The different neural activity can manifest in absence of any physical response, and can be elicited at image presentation rates far exceeding those to which a human could normally respond. The data analysis tool 110 can control aspects of the data renderings 112 using the amplitudes of signals in one or more of the wave bands. Interpretation of the data renderings 112 facilitates fast and seamless navigation of the data set in several dimensions. In addition, the combination of high spatial resolution of the eye-tracking and the accurate timing information from the brain waves cover a wide range of human responses that can interact with advanced statistical embeddings in an efficient synthesis, promoting an expedited cooperative learning process. Precision timing information from brain waves also opens up a whole new world of possibilities for other sensory modalities beyond visual and audible modalities.

Figure 2:
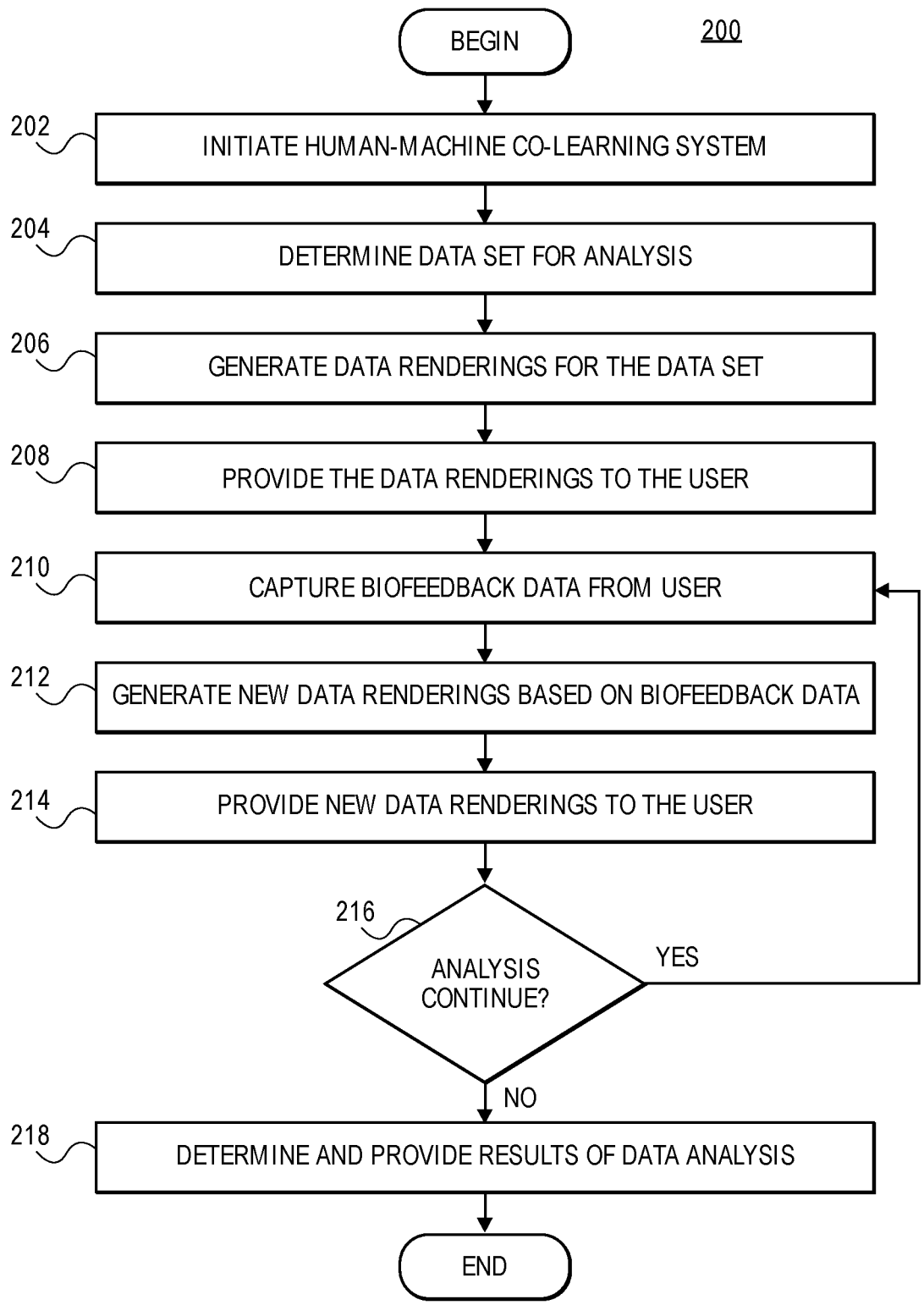
FIG. 2 illustrate an example of a processes of human-machine co-learning, according to various aspects of the present disclosure.

FIG. 2 illustrates an example of a process 200 for analyzing data using human-machine co-learning, according to aspects of the present disclosure. While FIG. 2 illustrates various stages that can be performed, stages can be removed and additional stages can be added. Likewise, the order of the illustrated stages can be performed in any order.

After the process begins, in 202, the human-machine co-learning system is initiated. For example, the user 114 (or other user) can initiate execution of the data analysis tool 110 on the computer system 102. Likewise, for example, the user 114 (or other user) can initiate set up and configure the data output devices 116 and the human interface devices 120. In one example, the data analysis tool 110 can provide the user interface to the user 114 (or other user). The user interface can allow the user 114 (or other user) to operate the data analysis tool 110.

In 204, a data set for analysis can be determined. For example, the data analysis tool 110 can receive or retrieve one or more data sets from the repository 104, the repository 106, or both. Likewise, for example, the data analysis tool 110 can receive or retrieve the one or more data sets from other sources in real-time. In any example, the user 114 (or other user) can select the one or more data sets for analysis. Likewise, the data analysis tool 110 can automatically select one or more data sets for analysis.

In any example, the data set can include any type of data desired to be analyzed to locate embedding, pattern, or information of relevance or significance. For example, the data set can include geographic data, traffic pattern data, network usage traffic data, security information, financial data, voting data, polling data, and the like. While several examples of data are disclosed herein, any type of data can be analyzed with the human-machine co-learning system 100.

In 206, the data analysis tool 110 generates data renderings for the data set. The data analysis tool 110 can generate any type of rendering to gain biofeedback from the user 114. For example, the data analysis tool 110 can generate visual data, audio data, other physical stimuli, and combinations thereof.

In 208, the data analysis tool 110 provides the data renderings to the user 114. The data analysis tool 110 can provide the data renderings 112 to the user 114 via the data output devices 116. The data analysis tool 110 (and other systems and software of the computer system 102) can convert the data renderings 112 to one or more signals that are usable by the data output devices 116.

In 210, the data analysis tool 110 captures biofeedback data from the user 114. The data analysis tool 110 (and other systems and software of the computer system 102) can communicate with the human interface devices 120 to receive or retrieve the biofeedback data 118. The biofeedback data 118 can be any type of data representing the actions, reactions, physical state, etc. while consuming the data renderings 112. For example, the biofeedback data 118 can include brain wave data, eye movement tracking data, micro-facial expressions data, body language, vital sign data, muscle movement data, capillary dilation data, skin conductivity data, and the like.

In 212, the data analysis tool 110 generates new data renderings based on the biofeedback data. As the user 114 consumes the data renderings, the human interface devices 120 detects and records, as biofeedback data 118, the user 114 various reactions to the data renderings 112, and the data analysis tool 110 can incorporate the biofeedback data 118 into the data evaluation process. For example, immediate biofeedback data 118 from the user 114 can drive the real time creation of the data renderings 112 by steering through the parameter space of possible embeddings. Monitoring the user 114 behavior and response can provide useful information about ongoing thought processes of the user during the data analysis.

For example, based on the received biofeedback data 118, the data analysis tool 110 can identify and enhance local signatures and their immediate surroundings. Using the local signature and surrounding, the data analysis tool 110 can uncover hidden topological relations among the data set forming the data renderings 112, while more global views can provide better contextual information. As the user 114 considers competing hypotheses, the human-machine co-learning system 100 can automatically present the data renderings in a timely manner. The data analysis tool 110 can automatically render feature vectors into a familiar environment, where the user 114 can subconsciously make the objective choices without effort and without blurring the results with false rationales that may be based on selective or insufficient facts.

In 214, the data analysis tool 110 provides the new data renderings to the user 114. The data analysis tool 110 can provide the data renderings 112 to the user 114 via the data output devices 116. The data analysis tool 110 (and other systems and software of the computer system 102) can convert the data renderings 112 to one or more signals that are usable by the data output devices 116.

In 216, the data analysis tool 110 determines whether to continue the analysis. For example, the data analysis tool 110 can continue to present data renderings 112 to the user 114 and collect the biofeedback data 118 until a solution is determine, the user 114 (or other user) stops the analysis, or combination of both. The data analysis tool 110 provides a constant multi-channel synchronous feedback loop that connects the computer system 102 to the user 114. As the new data renderings 112 are presented to the user 114, the data analysis tool 110 simultaneously collects the biofeedback data 118. In real-time, the data analysis tool 110 incorporates biofeedback into one or more statistical models behind the data rendering.

For example, the data analysis tool 110 implement eye-tracking, as discussed above, to precisely identify the region of interest in a large field of view. Following the movement of the eyes of the user 114, the data analysis tool 110 can accurately pinpoint the operator's gaze in two- or three dimensions, and flag these interesting places. Interactive visualization can explore these targeted areas, and gradually shift toward "better" views until the focus of the user 114 moves to other features and trends. Such user-flagged regions of interest can be used to help train classifiers more effectively. For instance, similar to heat maps of football fields during a game, the data analysis tool 110 can create maps of most looked-at places. Over time as the embeddings evolve, the data analysis tool 110 can automatically find the unusual locations in the multi-dimensional feature space.

In another example, the data analysis tool 110 can utilize statistical algorithms continuously generate varying data renderings 112 of the data set. The data analysis tool 110 can apply the statistical algorithms according to the context that is currently being examined. Instead of just creating global solutions, the data analysis tool 110 enables the user 114 to restrict the analysis to a smaller volume, if restriction enhances the features. As such, the data analysis tool 110 allow the user to "zoom in" and "zoom out" on the data renderings not only in terms of visualization of the data but in terms of the domain of the analysis. For example, the data analysis tool 110 can apply the concepts of triage analytics, which focus on high level aggregates, and drill-down analytics, available upon request for specific areas of data (e.g., "zoom in" and "zoom out"). The data analysis tool 110 can apply the "zoom in" and "zoom out" procedures to the concept of using resources to perform detailed analysis when an operator is following a train of thought. Thus, the user 114 can designate a focus area in any projection, and the data analysis tool 110 can immediately apply advanced algorithms to incrementally enhance the data renderings 112. The data analysis tool 110 can also utilize algorithms that select and apply the optimal machine learning methodology or combination of methodologies.

In another example, when the user 114 is viewing the data renderings 112, sensory stimuli outside of normal patterns can elicit autonomous nervous system responses, e.g., the pupil reflex, the eye lid reflex and scanning eye movements. The data analysis tool 110 can identify specific composite bio-potential signatures, from the biofeedback data 118 detected by the human interface devices 120, based on the temporal sequence of discrete responses at the different frequency bands that are analyzed. The data analysis tool 110 can be enabled to map independent wave bands in the alpha and beta ranges to any kind of user action. In other words, the data analysis tool 110 can grow ostensible "brainfingers" that correspond to signals in the wave bands, and can learn to use them to steer the data renderings toward interesting features. A subconscious random walk in several dimensions can map out more details in data than thousands of mouse clicks. This is high-dimensional navigation without the complication of the missing human intuition in high dimensions.

In another example, the data analysis tool 110 can utilize RSVP algorithms and processes. In RSVP, the user 114 is presented with data renderings 112 including a series of images in rapid succession while the biofeedback data 118 including neural activity is monitored. If the user 114 looks for a particular type of visual content in the image stream, the neural activity following the matching content will differ from the baseline behavior. This difference, called "P300" due to its positive polarity and 300-millisecond latency, can reliably detected by digital signal processing techniques, and can be traced back with high precision to the triggering image in the data renderings 112. For the purposes of a BCI, because the P300 is a product of the subconscious processing of visual content, it can manifest in absence of any physical response, and can be elicited at image presentation rates far exceeding those to which a human could normally respond, up to 50 Hz. This response is approximately 100 times faster than what could be achieved without BCI. Several independent brain wave bands can be defined in known frequency ranges, e.g., alpha, beta. The data analysis tool 110 can control aspects of the data renderings 112 using the amplitudes of signals in one or more of the wave bands. Interpretation of the data renderings facilitates fast and seamless navigation of the data set in several dimensions. In addition, the combination of high spatial resolution of the eye-tracking and the accurate timing information from the brain waves cover a wide range of human responses that can interact with advanced statistical embeddings in an efficient synthesis, promoting an expedited cooperative learning process. Precision timing information from brain waves also opens up a whole new world of possibilities for other sensory modalities beyond visual and audible modalities.

It is worth re-emphasizing one of the aspects of this approach: the importance of context, the questions the operator is seeking to answer. People generally look at data with specific questions in mind. Does it match what I am looking for? Is it different from what I normally see? Can I see any patterns in the data? Also, people will look at the same data but with different questions in mind, and see different things, and come to different conclusions. For example, when someone is looking to buy a new car, some of the data they look at will be the same regardless of why they are buying the car. Other data, however, can be contextually dependent upon the reason they are buying the car. If someone is buying a used car for a 16-year old novice driver, the queries and data search pathways will be different than if they are looking to buy a car for themselves as a fun recreational vehicle. The context of the questions can be important as the data that is being queried, and the results may be determined by the context just as by the data itself. The "zoom in and zoom out of domains" approach can allows the human-machine co-learning system 100 to adapt the inquiry pathway to a specific context at that moment, rather than forcing the user 114 along predetermined inquiry pathways governed by a limited framework of options. By moving away from pre-defined analytic options, "zoom in and zoom out of domain" can open up many previously unexplored avenues of inquiry.

Returning to FIG. 2, in 218, the data analysis tool 110 determines and provides the results of the data analysis. The results of the data analysis can be any meaningful features of interest, embeddings, patterns, or information that is contained within the data.

In one example, the result of the data analysis can be utilized to train one or more machine learning algorithm. For example, as the data renderings 112 are generated and the biofeedback data 118, the data analysis tool 110 can analyze the user 114 response to the data renderings 112 and utilize the response to train one or more machine learning algorithm. Thus, the data analysis tool 110 can improve the future analysis of similar sets of data.

The data analysis tool 110 can provide the results to the user 114 or other user of the human-machine co-learning system 100. The data analysis tool 110 can store the results, for example, in the repository 104, the repository, other data stores, or combinations thereof. The data analysis tool 110 can provide the results to other computer system, for example, via the network 108.

FIGS. 3A, 3B, and 4A-C illustrate one example of the human-machine co-learning system 300 using the process 200 described above, according to various aspects. In this example, the human-machine co-learning system 300 implements RSVP as a fast, human-in-the-loop classification and search tool for visualizations of large data sets. As RSVP has traditionally been used to process photographs and images of the natural world, the first test of the system was a search application over a synthetic and completely digital dataset.

Figure 3A:
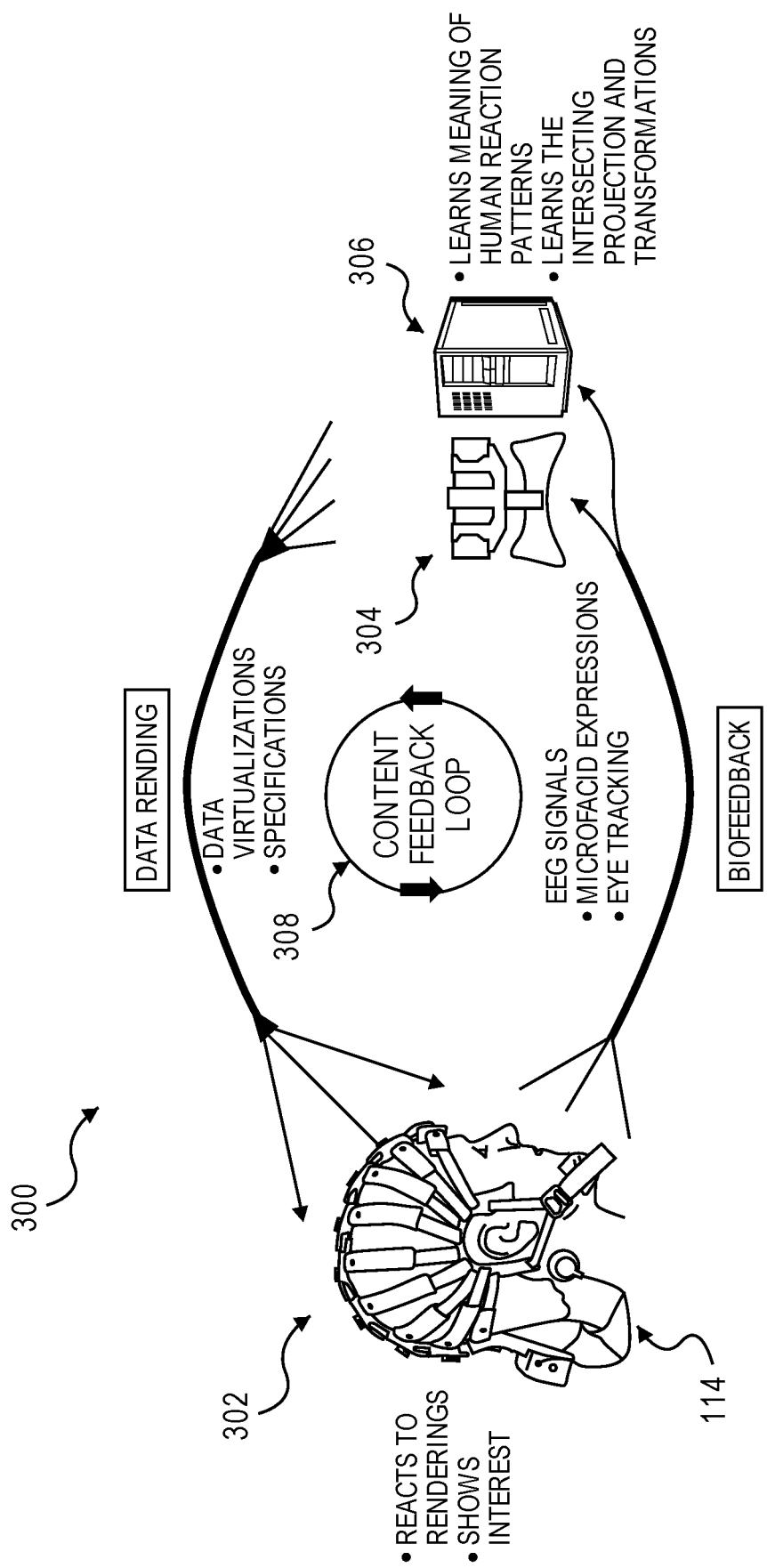
FIGS. 3A and 3B illustrate one example of human-machine co-learning system and processes, according to various aspects of the present disclosure.
Figure 3B:
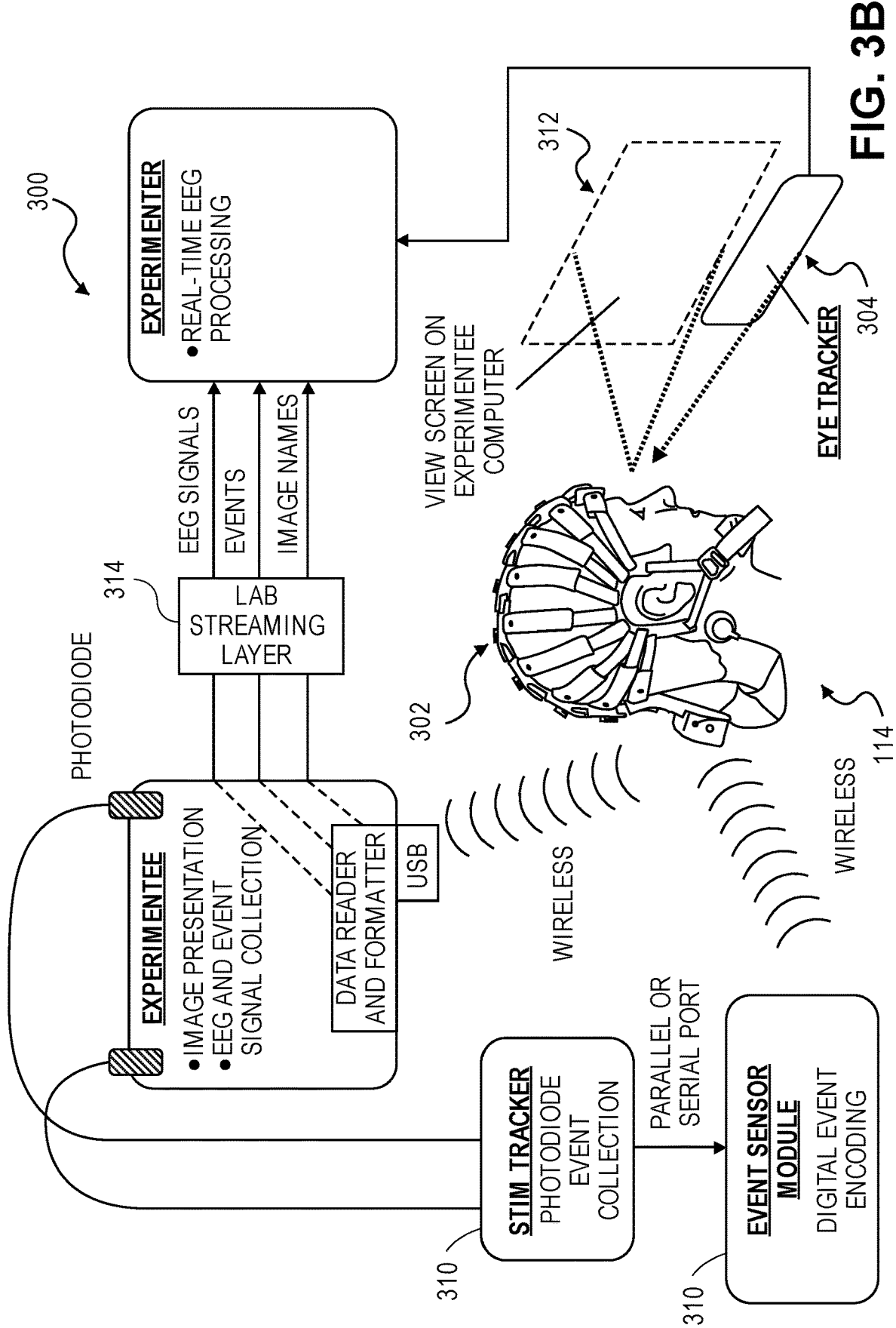

Referring to FIGS. 3A and 3B, the human-machine co-learning system 300 implements a feedback loop around an RSVP system in order to demonstrate the power of human selection in a data set search. By using locally biased steering around views triggered by RSVP, the user 114 can quickly steer a search over a visual, high-dimensional dataset. Previous RSVP experiments show the ability of the user 114 to trigger on a fixed definition of a target image; however, in a dataset exploration setting the user 114 may not yet know exactly what to look for. A dynamic definition of a target allows the user 114 to discover what is interesting and steer an exploratory path through the data renderings 112 of the set of data. With a simple RSVP feedback loop, the human-machine co-learning system 300 establishes that a human subject is able to adapt his threshold of what is "interesting" as a search progresses.

The human-machine co-learning system 300 include a brain wave detector 302, for example, a traditional wet EEG cap with 64 electrodes made by BioSemi. The brain wave detector 302 may require preparation, e.g., gel in the hair and a locked door behind which 3 people can run the analysis. Suitable dry caps, which are more usable in an office environment, can be used. An example is the Cognionics wireless 72-channel dry electrode headset. This headset collects data from up to 64 dry electrodes, but allows for 8 extra channels of data to be concurrently passed along with the EEG data.

The human-machine co-learning system 300 can include one or more eye tracking devices 304. One example of an eye tracking device 304 is the Eye link 1000 Plus produced by SR Research. This is a high-end, precision eye tracker which can be used to pinpoint exact areas of interest as well as track pupil dilation, saccades, and micro-saccades. Another example of an eye tracking device is the EyeTribe Eye Tracker, a more affordable and mobile solution that only provides low-resolution data on eye activity. The EyeTribe can be used to sense the level of user engagement. The eye tracking device 304 can provide a plethora of digital features which, when synchronized with the data renderings, will aid in data classification and processing.

The human-machine co-learning system 300 can include a feedback loop 308, operated by the data analysis tool 110 executing on a computer system 306, directed by EEG signals and signals collected by other types of sensors during RSVP sessions. For example, the human interface devices can include sensors that are hands-free, require no physical tethers to a computer, and are easily operated in a normal office setting. The eye tracking device 304 can provide higher-resolution data on area of interest of the user 114 than can be achieved with an EEG cap alone. The human-machine co-learning system 300 can use the eye tracking device 304 to sense the level of user engagement; the RSVP data exploration session may be paused when the user 114 is distracted or looking away from the screen.

As shown in FIG. 3B, the feedback loop 308 connects a computer system 306 to the user 114 via the human interface devices 310 that detects signals (e.g., via the above described systems and additional sensors, such as photodiodes attached to a stimulation tracking module), collects processed signal information, and presents images to the operator via a display 312. The data analysis tool 110 can include a data stream management layer 314, such as the Lab Streaming Layer (LSL) toolkit, is an appropriate framework for sensor data harvesting and synchronization. LSL can be compatible with each of the sensors described above and is therefore an example of a sensor signal harvesting platform.

Figure 4A:
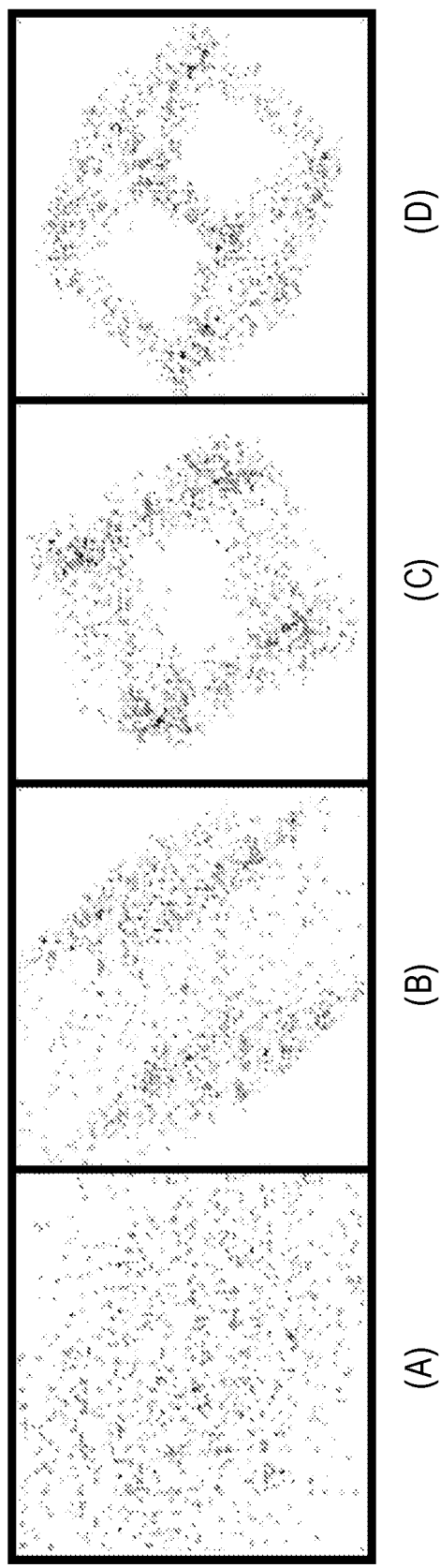
FIGS. 4A-4C illustrate an example of data and results for human-machine co-learning processes of FIGS. 3A and 3B, according to various aspects of the present disclosure.

Referring to FIG. 4A, a test data set included a 30 point set sampled from a wire-frame of a three-dimensional cube. The test data set was then extended to include noise in the form of additional points in the 30 parameter space and in additional dimensions. For example, an implementation includes appending two random numbers after the (x,y,z) coordinates of a point, which yields a five dimensional dataset. A random 50 rotation is applied to these points, mixing the coordinates so that the structure of the cube is lost in the noise: any axis-parallel views show only noise, as shown in inset (A) of FIG. 4A. The goal of the human-machine co-learning system 300 can be to recover the hidden cube by finding the correct transformation using RSVP feedback from the user 114. This exercise demonstrates that the human-machine co-learning system 300 does not have to operate using a specified cost function or goodness of measure to derive a solution, but can solely rely on the power of the human brain.

Using the process 200 described above, the human-machine co-learning system 300 begins the analysis by performing random rotations on the simulated dataset and rendering the rotations to for data renderings 112 and provide the data renderings to the display 312 according to RSVP. The data renderings 112 can contain noise. The data renderings 112 or movie of flicking images is just the "war of ants," in which the high-dimensional dataset appears to be just noise. On rare occasions, however, the random projections will have some structure, which the brain will detect. As soon the operator encounters a rendered plot that contains some structure, see inset (B) of FIG. 4A, the human input devices of the feedback loop (e.g., an eye tracking device 304 and a brain wave detector 302 of detect an event, such as a P300 wave or an eye focal movement. The human input devices transmit the detected signal to signal processors, such as an event sensor module that encodes the signal into a readable digital event to be processed by the data analysis tool 110. The detected reaction effectively teaches the human-machine co-learning system 300 something about the data, and the human-machine co-learning system 300 can start biasing the machine learning method behind the visualization toward the views flagged by RSVP. Over time, the sample of images gets enriched in structure and eventually the human-machine co-learning system 300 discovers the 30 cube, as shown via the progression of insets (A)-(D) of FIG. 4A.

Figure 4B:
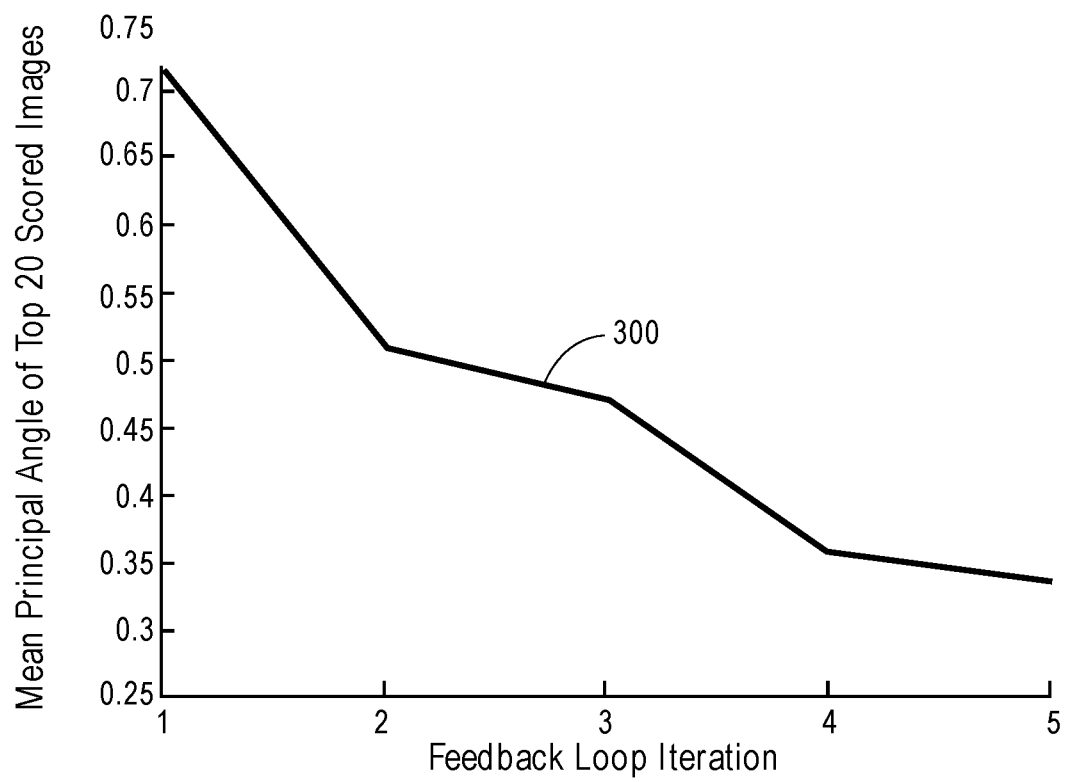

FIG. 4B illustrates the average error in the recovered rotation over time. In particular, curve 400 represents the principal angle, in radians, between the rotation matrix used to hide the cube and the rotation matrix of a given random rotation. The principal angle decreases with the training as the solution converges to the true transformation. The graph shows that the principal angle between the true subspace containing the cube and the solution shrinks quickly. However, data rendering in an RSVP setting poses a number of challenges that should not be overlooked. Plots that can be processed at high rates by the brain are potentially quite different from traditional visualizations, and generating such visualizations in real-time for RSVP (10 Hz) might also prove to be computationally challenging. For example, in a first iteration of the experiment, the operator can be tasked to identify, or trigger on, data plots showing structure while ignoring plots that only show noise. The results show that the method in which the data is rendered can be affected the ability of the human subject to correctly classify plots as structured or noisy. The can require interpretation. Data points rendered in white with a black background can be more digestible than plots with a white background and colored data.

Figure 4C:
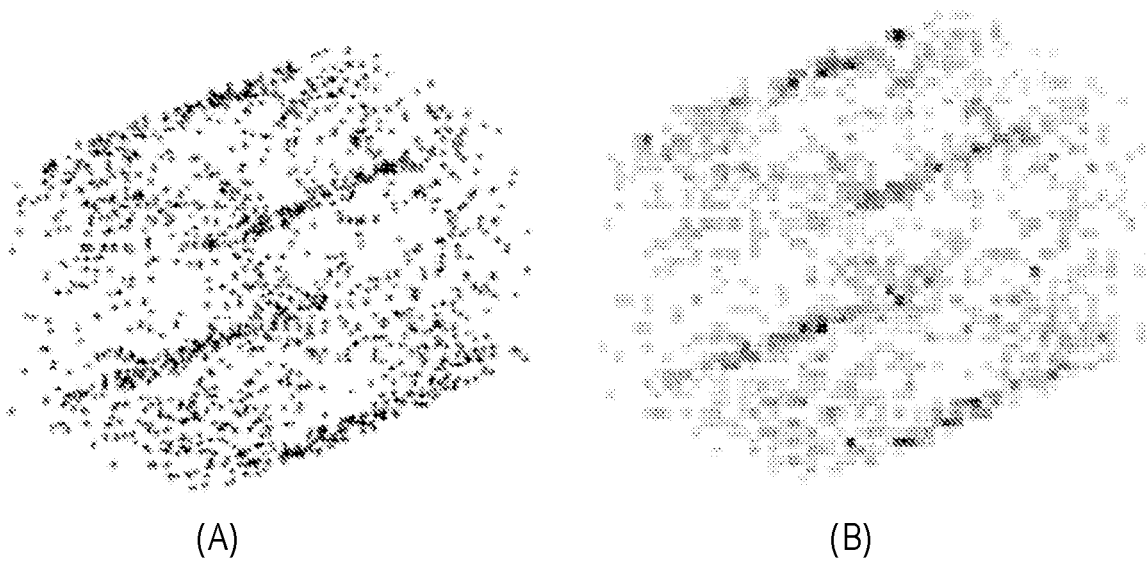

In an experiment of the human-machine co-learning system 300 initially rendered the data as a simple scatter plot showing every point of the data set, as shown in inset (A) of FIG. 4C. The process of showing high resolution scatterplots, at a rate of ten per second, proved to create a movie-like effect, and the perceived "motion" of the data points between plots became a confusing distraction for the operator. This was addressed by rendering the data as a low resolution, two-dimensional histogram instead, as shown in inset (B) of FIG. 4C. The lower resolution plots still accurately represented the potential structure in the data and proved easier for the operator to process at 10 Hz because there was no perceived motion of the points. Based upon the initial experiments with RSVP, it was shown that minimalistic, soft-edged visualizations tend to perform better than nuanced, high-detail plots.

The human-machine co-learning system 300 can be configured to be as generally applicable to dataset interaction as possible. For example, one application is the exploration of telescope image datasets; distinguishing images that contain interesting astronomical phenomena from blurry or noisy images is a straightforward application of RSVP. Another example uses the human-machine co-learning system 300 to discover outlier events in network traffic datasets. While displaying a visual playback of network traffic, RSVP can capture and filter moments of network activity that interest the user 114.

Data visualization is a component to the success of data exploration with the human-machine co-learning system 300, and it is clear that not all datasets are intuitively visualized in a meaningful way. The human-machine co-learning system 300 may use RSVP to discover interesting and unknown visualizations of datasets, particularly network traffic data. While investigating a dataset, the data renderer could iterate through and display a host of different visualizations of the same data; a particular visualization technique could reveal some unknown structure that intrigues the user 114. From the EEG signals, the human-machine co-learning system 300 can capture this human interest and mark the particular visualization for further use. While at a glance this trial-and-error discovery of effective visualizations may not seem very efficient, the speed of interaction between human and computer via RSVP allows the human-machine co-learning system 300 to process hundreds of different visualizations over the course of a minute.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 5:
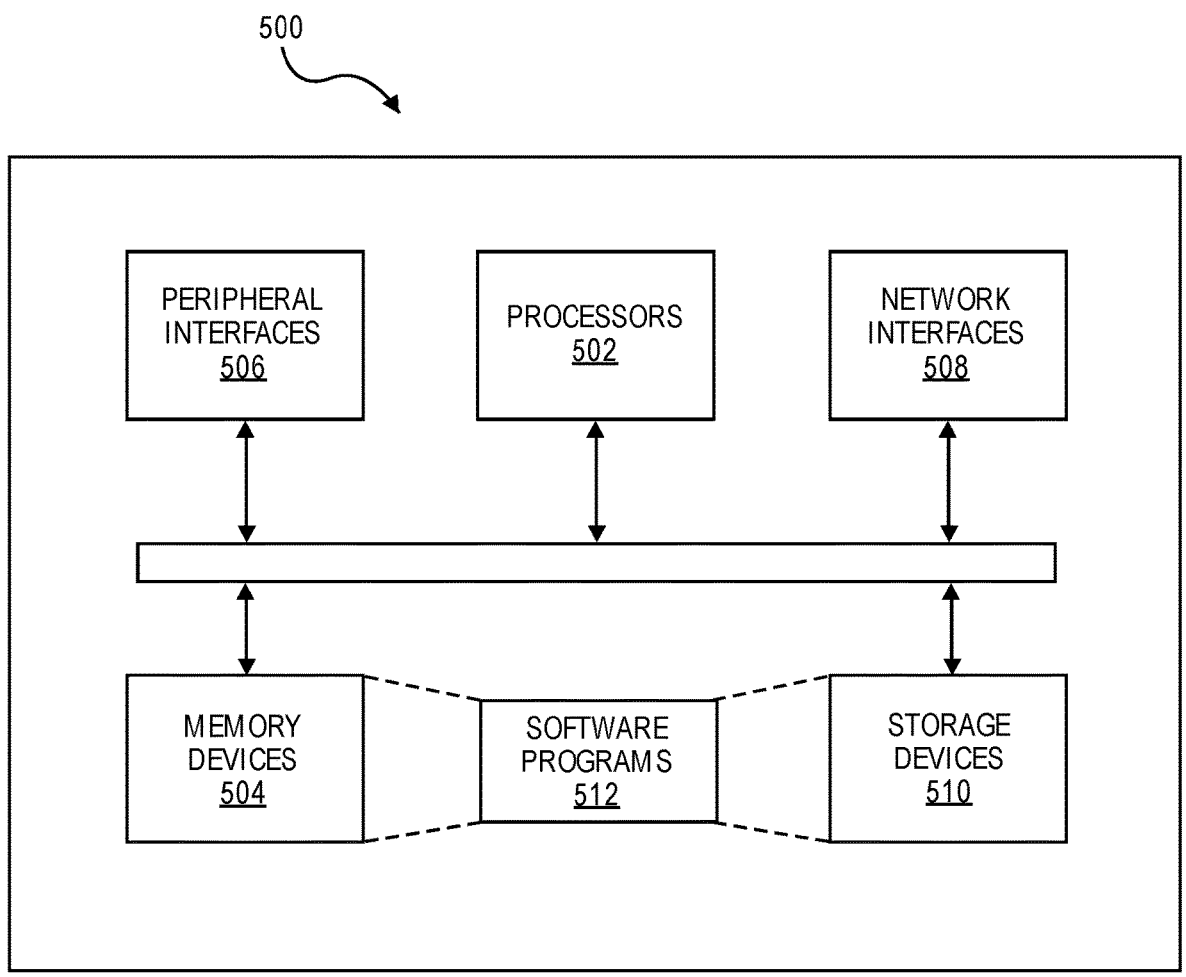
FIG. 5 illustrates an example of a hardware configuration for a computer device, according to various aspects of the present disclosure.

For example, FIG. 5 illustrates an example of a hardware configuration for the computer system 102 in the human-machine co-learning system 100. While FIG. 5 illustrates various components contained in the computer device 500, FIG. 5 illustrates one example of a computer device and additional components can be added and existing components can be removed.

The computer device 500 can be any type of computer device. As illustrated in FIG. 5, the computer device 500 can include one or more processors 502 of varying core configurations and clock frequencies. The computer device 500 can also include one or more memory devices 504 that serve as a main memory during the operation of the computer device 500. For example, during operation, a copy of the software that supports the data analysis tool 110 can be stored in the one or more memory devices 504. The computer device 500 can also include one or more peripheral interfaces 506, such as keyboards, mice, touchpads, computer screens, touchscreens, etc., for enabling human interaction with and manipulation of the computer device 500.

The computer device 500 can also include one or more network interfaces 508 for communicating via one or more networks, for example the network 108, such as Ethernet adapters, wireless transceivers, or serial network components, for communicating over wired or wireless media using protocols. The computer device 500 can also include one or more storage device 510 of varying physical dimensions and storage capacities, such as flash drives, hard drives, random access memory, etc., for storing data, such as images, files, and program instructions for execution by the one or more processors 502.

Additionally, the computer device 500 can include one or more software programs 512 that enable the functionality of the data analysis tool 110 described above. The one or more software programs 512 can include instructions that cause the one or more processors 502 to perform the processes described herein. Copies of the one or more software programs 512 can be stored in the one or more memory devices 504 and/or on in the one or more storage devices 510. Likewise, the data utilized by one or more software programs 512 can be stored in the one or more memory devices 504 and/or on in the one or more storage devices 510.

The computer device 500 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network (SAN) familiar to those skilled in the art. Similarly, any necessary files for performing the functions attributed to the computers, servers, or other network devices may be stored locally and/or remotely, as appropriate.

In implementations, the components of the computer device 500 as described above need not be enclosed within a single enclosure or even located in close proximity to one another. Those skilled in the art will appreciate that the above-described componentry are examples only, as the computer device 500 can include any type of hardware componentry, including any necessary accompanying firmware or software, for performing the disclosed implementations. The computer device 500 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise a random access memory (RAM), a read only memory (ROM), a flash memory, an electrically erasable programmable read only memory (EEPROM), a compact disc read only memory (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

As non-limiting examples unless specifically indicated, any repository, database, or data store described herein can comprise a local database, online database, desktop database, server-side database, relational database, hierarchical database, network database, object database, object-relational database, associative database, concept-oriented database, entity-attribute-value database, multidimensional database, semi-structured database, star schema database, XML database, file, collection of files, spreadsheet, or other means of data storage located on a computer, client, server, or any other storage device known in the art or developed in the future. File systems for file or any repository, database, or data store can be any file system, including without limitation disk or shared disk, flash, tape, database, transactional, and network file systems, using UNIX, Linux, Mac OS X, Windows FAT or NTFS, FreeBSD, or any other operating system.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

What is claimed is:

1. A method, comprising:
obtaining a data set to be analyzed;
generating a tailored visual data rendering and a tailored sonic data rendering from the data set using one or more statistical algorithms to identify data renderings representative of a current interest of a user for which one or more relationships among the data is analyzed and the one or more statistical algorithms comprise a clustering algorithm, a regression algorithm, a low-dimensional embedding algorithm, a principal component analysis algorithm, or combinations thereof;
providing the tailored visual data rendering and the tailored sonic rendering to the user via one or more output devices;
capturing biofeedback data from the user using one or more human interface devices, wherein the biofeedback data comprises biological responses to the tailored visual data rendering and the tailored sonic rendering;
continuously generating and providing new tailored data renderings based on the biofeedback data using the one or more statistical algorithms, wherein the new tailored data renderings incorporate features in the tailored visual data rendering and the tailored sonic rendering identified from the biofeedback data and the new data renderings are iteratively generated based on the biofeedback data and the new tailored data renderings are provided continuously to the user via the one or more output devices; and
determining one or more features of interest in the data set based on the biofeedback data and the new tailored data renderings.

2. The method of claim 1, wherein continuously generating and providing the new tailored data renderings comprises:
displaying, on a display device, one or more of visual renderings of the new tailored data renderings at a high display rate.

3. The method of claim 1, wherein the new tailored data renderings are iteratively generated until the one or more features of interest is identified in the data set.

4. The method of claim 1, wherein the new tailored data renderings comprises new visual renderings of a reduced portion of the data set.

5. The method of claim 1, the method further comprising:
training a machine learning algorithm using the biofeedback data and the new tailored data renderings.

6. The method of claim 1, wherein the biofeedback data comprises brain wave data, eye movement tracking data, micro-facial expressions data, body language, vital sign data, muscle movement data, capillary dilation data, and skin conductivity data.

7. The method of claim 1, wherein the data set is representative of geographic data, traffic pattern data, network usage traffic data, security information, financial data, voting data, polling data, or data derived external from the user.

8. A system, comprising:
one or more output devices;
one or more human interface devices; and
a computer system coupled to the one or more output devices and the one or more human interface devices, wherein the computer system comprises one or more memory devices storing instructions and one or more processors coupled to the one or more memory devices and configured to execute the instructions to perform a method comprising:
obtaining a data set to be analyzed;
generating a tailored visual data rendering and a tailored sonic data rendering from the data set using one or more statistical algorithms to identify data renderings representative of a current interest of a user for which one or more relationships among the data is analyzed and the one or more statistical algorithms comprise a clustering algorithm, a regression algorithm, a low-dimensional embedding algorithm, a principal component analysis algorithm, or combinations thereof;
providing the tailored visual data rendering and the tailored sonic rendering to the user via one or more output devices;
capturing biofeedback data from the user using one or more human interface devices, wherein the biofeedback data comprises biological responses to the tailored visual data rendering and the tailored sonic rendering;
continuously generating and providing new tailored data renderings based on the biofeedback data using the one or more statistical algorithms, wherein the new tailored data renderings incorporate features in the tailored visual data rendering and the tailored sonic rendering identified from the biofeedback data and the new data renderings are iteratively generated based on the biofeedback data and the new tailored data renderings are provided continuously to the user via the one or more output devices; and
determining one or more features of interest in the data set based on the biofeedback data and the new tailored data renderings.

9. The system of claim 8, wherein continuously generating and providing the new tailored data renderings comprises:
displaying, on a display device, one or more of visual renderings of the new tailored data renderings at a high display rate.

10. The system of claim 8, wherein the new tailored data renderings are iteratively generated until the one or more features of interest is identified in the data set.

11. The system of claim 8, wherein the new tailored data renderings comprises new visual renderings of a reduced portion of the data set.

12. The system of claim 8, the method further comprising:
training a machine learning algorithm using the biofeedback data and the new tailored data renderings.

13. The system of claim 8, wherein the biofeedback data comprises brain wave data, eye movement tracking data, micro-facial expressions data, body language, vital sign data, muscle movement data, capillary dilation data, and skin conductivity data.

14. The system of claim 8, wherein the data set is representative of geographic data, traffic pattern data, network usage traffic data, security information, financial data, voting data, polling data, or data derived external from the user.

15. A non-transitory computer readable medium storing instructions for causing one or more processors to perform a method, the method comprising:
obtaining a data set to be analyzed;
generating a tailored visual data rendering and a tailored sonic data rendering from the data set using one or more statistical algorithms to identify data renderings representative of a current interest of a user for which one or more relationships among the data is analyzed and the one or more statistical algorithms comprise a clustering algorithm, a regression algorithm, a low-dimensional embedding algorithm, a principal component analysis algorithm, or combinations thereof;
providing the tailored visual data rendering and the tailored sonic rendering to the user via one or more output devices;
capturing biofeedback data from the user using one or more human interface devices, wherein the biofeedback data comprises biological responses to the tailored visual data rendering and the tailored sonic rendering;
continuously generating and providing new tailored data renderings based on the biofeedback data using the one or more statistical algorithms, wherein the new tailored data renderings incorporate features in the tailored visual data rendering and the tailored sonic rendering identified from the biofeedback data and the new data renderings are iteratively generated based on the biofeedback data and the new tailored data renderings are provided continuously to the user via the one or more output devices; and
determining one or more features of interest in the data set based on the biofeedback data and the new tailored data renderings.

16. The non-transitory computer readable medium of claim 15, wherein continuously generating and providing the new tailored data renderings comprises:
displaying, on a display device, one or more of visual renderings of the new tailored data renderings at a high display rate.

17. The non-transitory computer readable medium of claim 15, wherein the new tailored data renderings are iteratively generated until the one or more features of interest is identified in the data set.

18. The non-transitory computer readable medium of claim 15, wherein the new tailored data renderings comprises new visual renderings of a reduced portion of the data set.

19. The non-transitory computer readable medium of claim 15, the method further comprising:
training a machine learning algorithm using the biofeedback data and the new tailored data renderings.

20. The non-transitory computer readable medium of claim 15, wherein the data set is representative of geographic data, traffic pattern data, network usage traffic data, security information, financial data, voting data, polling data, or data derived external from the user.

* * * * *